US009626698B2

(12) United States Patent
Abraham et al.

(10) Patent No.: US 9,626,698 B2
(45) Date of Patent: Apr. 18, 2017

(54) SYSTEMS AND METHODS FOR POWER EFFICIENT DISCOVERY OF INFRASTRUCTURE SERVICES ON A NETWORK

(71) Applicant: QUALCOMM Incorporated, San Diego, CA (US)

(72) Inventors: Santosh Paul Abraham, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 14/228,026

(22) Filed: Mar. 27, 2014

(65) Prior Publication Data

US 2014/0304078 A1    Oct. 9, 2014

Related U.S. Application Data

(60) Provisional application No. 61/807,904, filed on Apr. 3, 2013.

(51) Int. Cl.
*G06Q 30/00* (2012.01)
*G06Q 30/02* (2012.01)
(Continued)

(52) U.S. Cl.
CPC ........ *G06Q 30/0264* (2013.01); *H04W 4/008* (2013.01); *H04W 16/14* (2013.01);
(Continued)

(58) Field of Classification Search
CPC ................................................. G06Q 30/0264
See application file for complete search history.

(56) References Cited

U.S. PATENT DOCUMENTS 7,508,781 B2 * 3/2009 Liu .................... H04W 52/0216
370/311
7,984,073 B1 * 7/2011 Basiago ............ G06F 17/30312
707/802

(Continued)

FOREIGN PATENT DOCUMENTS

WO    WO-2006067271 A1    6/2006

OTHER PUBLICATIONS

Anonymous: "802.11 Sniffer Capture Analysis—Management Frames and Open Auth Cisco Technical Support Forum", Cisco Support Community Web site, May 25, 2012 (May 25, 2012), XP055120467, Retrieved from the Internet: URL:https://supportforums.cisco.com/document/101431/80211-sniffer-capture-analysis-management-frames-and-open-auth [retrieved on May 27, 2014]; 20 pages.

(Continued)

*Primary Examiner* — Bennett Sigmond
*Assistant Examiner* — Scott C Anderson
(74) *Attorney, Agent, or Firm* — Knobbe Martens Olson & Bear LLP

(57) ABSTRACT

Systems, methods, and devices for power-efficient discovery of infrastructure services on a network are disclosed. In one aspect, a method for using advertising windows to transmit service information on a network is disclosed. The method includes transmitting timing information regarding an advertising window during which information on services offered by one or more nodes on the network will be advertised. The method further includes during the advertising window, transmitting information on services offered by one or more nodes on the network.

15 Claims, 4 Drawing Sheets

(51) Int. Cl.
*H04W 48/14* (2009.01)
*H04W 4/00* (2009.01)
*H04W 16/14* (2009.01)
*H04W 28/18* (2009.01)
*H04W 56/00* (2009.01)

(52) U.S. Cl.
CPC ........... *H04W 28/18* (2013.01); *H04W 48/14* (2013.01); *H04W 56/00* (2013.01); *H04W 56/001* (2013.01); *H04W 56/002* (2013.01); *H04W 56/0015* (2013.01); *H04W 56/0025* (2013.01); *Y02B 60/50* (2013.01)

(56) References Cited

U.S. PATENT DOCUMENTS

| | | | |
|---|---|---|---|
| 2006/0003775 A1* | 1/2006 | Bull | G01S 5/0205 455/456.1 |
| 2006/0040656 A1 | 2/2006 | Kotzin | |
| 2007/0133448 A1 | 6/2007 | Gao et al. | |
| 2007/0141986 A1* | 6/2007 | Kuehnel | H04L 67/16 455/41.2 |
| 2007/0242645 A1* | 10/2007 | Stephenson | H04W 52/0216 370/338 |
| 2008/0049703 A1 | 2/2008 | Kneckt et al. | |
| 2009/0222576 A1* | 9/2009 | Elstermann | H04L 12/12 709/238 |
| 2011/0276403 A1* | 11/2011 | Vinayakray-Jani | G06Q 30/0241 705/14.64 |
| 2012/0246468 A1* | 9/2012 | Gabor | H04L 63/0823 713/156 |
| 2013/0044739 A1 | 2/2013 | Huang | |

OTHER PUBLICATIONS

Anonymous: "Chapter 4—802.11 Management frames—DotEleven", Dec. 14, 2011 (Dec. 14, 2011), XP055120460, Retrieved from the Internet: URL:http://dot11.info/index.php?title=Chapter_4_-_802.11_Management_frames [retrieved on May 27, 2014]; 5 pages.

Geier J, "802.11 Beacons Revealed", Internet Citation, Oct. 31, 2002 (Oct. 31, 2002), pp. 1-6, XP008117149, Retrieved from the Internet: URL:http://www.wi-fiplanet.com/tutorials/article.php/1492071 [retrieved on Jan. 14, 2010].

International Search Report and Written Opinion—PCT/US2014/032169—ISA/EPO—Jun. 12, 2014.

* cited by examiner

SYSTEMS AND METHODS FOR POWER EFFICIENT DISCOVERY OF INFRASTRUCTURE SERVICES ON A NETWORK

CLAIM OF PRIORITY UNDER 35 U.S.C. §119

The present application for patent claims priority to Provisional Application No. 61/807,904 entitled "SYSTEMS AND METHODS FOR POWER EFFICIENT DISCOVERY OF INFRASTRUCTURE SERVICES ON A NETWORK" filed Apr. 3, 2013, and assigned to the assignee hereof and hereby expressly incorporated by reference herein.

BACKGROUND

Field

The present application relates generally to wireless communications, and more specifically to systems, methods, and devices for power efficient discovery of infrastructure services on a network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. In general, some devices may serve as access points (APs) for a network, which other devices may connect to access functions of the network. Different APs may offer varying services to devices connected to those APs. Thus, improved systems, methods and devices for providing a low overhead method for APs to advertise a collection of services which may be accessed through the AP are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

In some aspects, a method for using advertising windows to transmit service information on a network is disclosed. The method comprises transmitting timing information regarding an advertising window during which information on services offered by one or more nodes on the network will be advertised; and during the advertising window, transmitting information on services offered by one or more nodes on the network.

Parts of the disclosure disclose a wireless communication device. The device comprises a transmitter, the transmitter configured to transmit timing information regarding an advertising window during which information on services offered by one or more nodes on the network will be advertised; and during the advertising window, transmit information on services offered by one or more nodes on the network.

In some aspects, a wireless communication device is disclosed. The device comprises means for transmitting timing information regarding an advertising window during which information on services offered by one or more nodes on the network will be advertised; and means for transmitting information on services offered by one or more nodes on the network during the advertising window.

In some aspects, a non-transitory, computer readable medium comprising instructions that when executed cause a processor in a device to perform a method for using advertising windows to transmit service information on a network is disclosed. The method comprises transmitting timing information regarding an advertising window during which information on services offered by one or more nodes on the network will be advertised; and during the advertising window, transmitting information on services offered by one or more nodes on the network.

In some aspects, a method for using advertising windows on a network is disclosed. The method comprises receiving timing information from an access point regarding an advertising window during which information on services offered by one or more nodes on the network will be advertised; and during the advertising window, receiving information from the access point on services offered by one or more nodes on the network.

In some aspects, a wireless communication device is disclosed. The device comprises a receiver configured to receive timing information from an access point regarding an advertising window during which information on services offered by one or more nodes on the network will be advertised; and during the advertising window, receive information from the access point on services offered by one or more nodes on the network.

In some aspects, a wireless communication device is disclosed. The device comprises means for receiving timing information from an access point regarding an advertising window during which information on services offered by one or more nodes on the network will be advertised; and means for receiving information from the access point on services offered by one or more nodes on the network during the advertising window.

In some aspects, a non-transitory, computer readable medium comprising instructions that when executed cause a processor in a device to perform a method for using advertising windows on a network is disclosed. The method comprises receiving timing information from an access point regarding an advertising window during which information on services offered by one or more nodes on the network will be advertised; and during the advertising window, receiving information from the access point on services offered by one or more nodes on the network.

DETAILED DESCRIPTION

Figure 1:
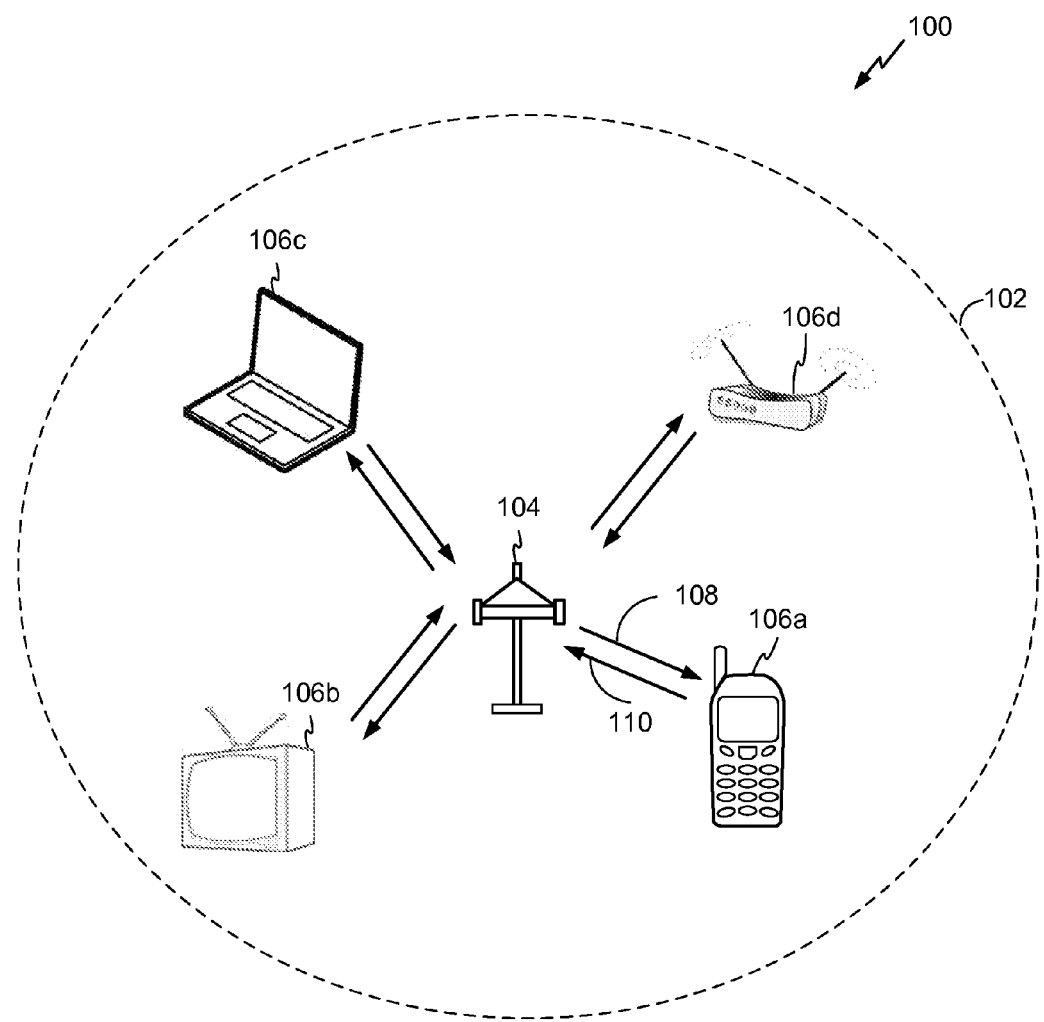
FIG. 1 shows an example wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11ah) compliant wireless link to obtain general connectivity to the Internet or to other wide area networks. In some implementations a STA may also be used as an AP.

An AP may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A STA may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or an AP or other device, may be used for smart metering or in a smart grid network. Such devices may provide sensor applications or be used in home automation. The devices may also be used in a healthcare context, such as for personal healthcare. They may also be used for surveillance, to enable extended-range Internet connectivity (for example, for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM or orthogonal frequency-division multiple access (OFDMA) techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a beacon), via a communication link such as the downlink 108, to other STAs 106 of the system 100, which may help the other STAs 106 to synchronize their timing with the AP 104, or which may provide other information or functionality. Such beacons may be transmitted periodically. In one aspect, the period between successive beacons may be referred to as a superframe. The time period between transmissions of beacons may be divided into a number of groups or intervals. In one aspect, the beacon may include, but is not limited to, such information as timestamp information to set a common clock between a number of devices on the network, a peer-to-peer network identifier, a device identifier, capability information, a superframe duration, transmission direction information, reception direction information, a neighbor list, and/or an extended neighbor list. Some of these are described in additional detail below. Thus, a beacon may include both common (e.g. shared) information among several devices and may also include information which is specific to a given device.

In some aspects, a STA 106 may be required to associate with the AP 104 in order to send communications to and/or receive communications from the AP 104. In one aspect, information for associating is included in a beacon which is broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services to communicate with a larger network, such as the Internet or a public switched telephone network (PSTN).

Figure 2:
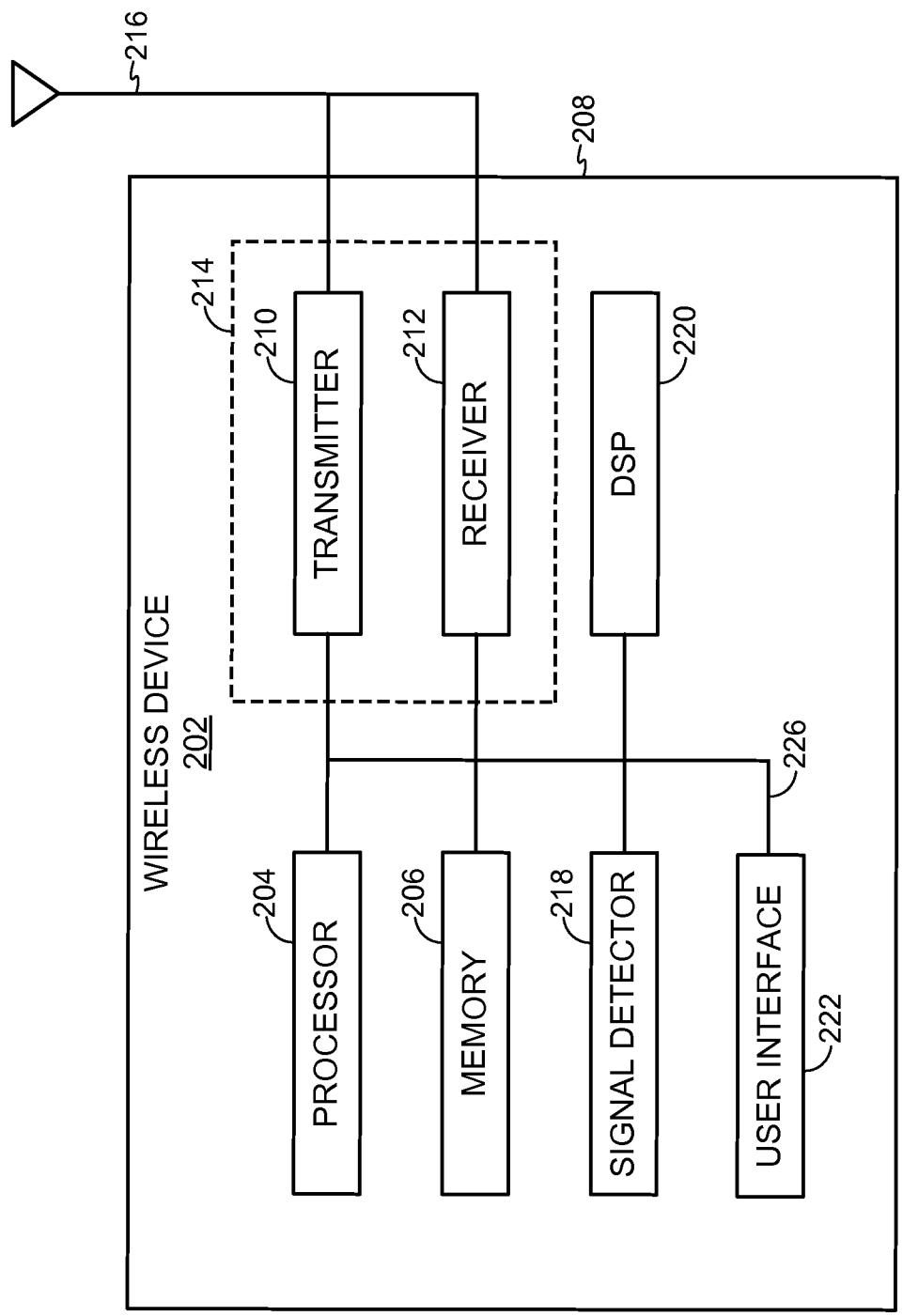
FIG. 2 shows a functional block diagram of an example wireless device that may be employed within the wireless communication system of FIG. 1.

FIG. 2 shows an example functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit messages, which may be referred to as "paging messages" that are configured to indicate to wireless devices whether or not the wireless devices need to wake up from a doze state and enter an awake state as discussed below. For example, the transmitter 210 may be configured to transmit paging messages generated by the processor 204, discussed above. When the wireless device 202 is implemented or used as a STA 106, the processor 204 may be configured to process paging messages. When the wireless device 202 is implemented or used as an AP 104, the processor 204 may also be configured to generate paging messages. The receiver 212 may be configured to wirelessly receive paging messages.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

An AP 104 may offer a wide variety of services to a STA 106. For example, the AP 104 may offer specialized services, such as printers, music streaming, games, or other types of services. These services may be offered on an ad hoc basis, and may vary with time. Other devices may also offer services to a STA 106, and these other devices may be available through the network of a particular AP 104. For example, a music streaming service may be offered by a device on the network of AP 104. In any given network, different APs may offer difference services to STAs connected to those APs. An AP 104 may also be able to run applications which may start or stop the offering of certain services to a STA 106. Because different services may be available through different APs, it may be beneficial for an AP to be configured to advertise which services are available through that AP. It may be beneficial for these advertisements to be sent during an advertising window. Such an advertising window may allow for power-efficient discovery of infrastructure services. For example, such an advertising window may allow STAs to "wake up" only during the advertising window to receive the advertisements, rather than requiring such STAs to remain awake at all times in order to listen for advertisement messages.

Figure 3:
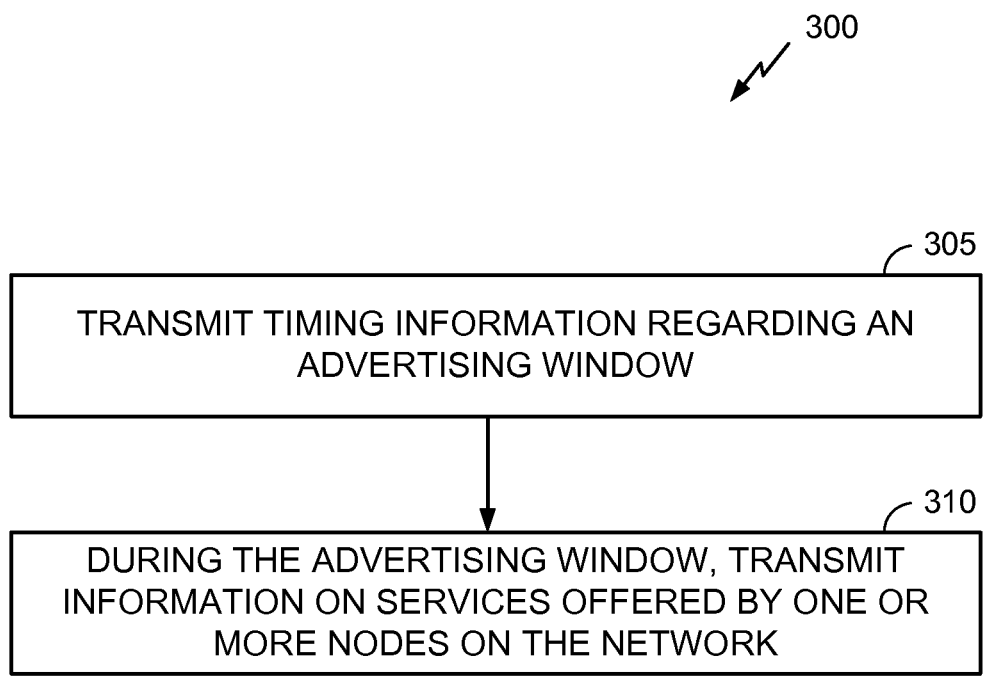
FIG. 3 is a flowchart of a method for using advertising windows to transmit service information on a network, which may be used on an AP such as AP 104.

FIG. 3 is a flowchart of a method for using advertising windows to transmit service information on a network, which may be used on an AP such as AP 104.

At block 305, the AP transmits timing information regarding an advertising window during which information on services offered by one or more nodes on the network will be advertised. For example, these advertising windows may be periodic or may be sporadic. In some aspects, the AP may transmit timing information in a beacon frame. The AP may also transmit timing information as part of a probe response frame. For example, a device may send the AP a probe request frame requesting information on services offered on the network, and the AP may transmit a probe response frame to that device. In some aspects, the AP may also transmit a minimum time to respond to a query. This time may represent a minimum time that the AP will take in order to respond to a query, where the response to the query may be sent in a future advertising window. In some aspects, the AP may transmit a time to respond to the query in a probe response frame.

At block 310, the AP transmits information on services offered by one or more nodes on the network during the advertising window. In some aspects, the AP may also retransmit queries during the advertising window. For example, the AP may receive queries at any time from other wireless devices, and may retransmit these queries during the advertising window. This retransmission may be beneficial, as it may allow other devices which may offer services such as STAs to have their advertisement messages heard by all devices on the network. This retransmission may also allow devices which wish to receive information about services to sleep at times other than the advertisement window, without missing advertising messages. In some aspects, during the advertising window, other devices may also transmit information on services offered by those other devices. For example, the AP may reserve a portion of the advertising window for messages from other devices which may also advertise services.

It may be beneficial to send advertisements regarding services during an advertising window. For example, the use of such an advertising window may minimize the number of duplicate advertisements sent to multiple devices. An advertisement window may be used to provide a low-overhead method for APs to advertise the collection of services that may be accessed through the AP. These windows may reduce network overhead, by minimizing the duplication of advertisements sent to different devices, as devices may not need to request information on which services are available, and can instead receive this information automatically during the advertising window. Similarly, advertising windows may reduce network bandwidth use, as the AP may not need to send individual responses to each device that requests information on a service, but can instead respond to all such requests with one or more broadcast or multicast messages during an advertising window. These advertising windows may also allow STAs to enter low-power states between the advertising windows without missing advertising messages. Advertisements may be sent such that they may be received by all nearby STAs, including those associated with the AP, those not associated with the AP, and by other APs. These advertisements may be sent to individual devices which request a listing of services, to devices which request information on the availability of a certain service, or periodically sent to all devices that may wish to learn which services are offered by one or more APs. For example, these advertisements may be multicast or broadcast messages sent to two or more devices.

In some aspects, an AP may transmit a beacon which contains timing information regarding an advertisement window. During the advertising window, the AP may advertise services which are available through the AP. This advertisement window may also include opportunities for STAs in the BSS to send out advertisements for services which they offer. In some aspects, the AP may schedule one advertising window for advertisements from the AP, and another separate advertising window for advertisements from other STAs. In some aspects, the AP may rebroadcast received queries during the advertising window to allow STAs that are service providers to receive such queries.

A number of different types of frames may be used to schedule an advertising window. For example, the AP may provide the scheduled time of the advertising window in beacons and/or in probe response frames. The advertising window may be periodic and occur with some regular frequency, or may be sporadic. For example, if the advertising window is periodic, some frames sent by the AP, such as beacons or probe response frames, may indicate a timing of the advertising windows and when they are scheduled. For example, this timing may comprise information on when the next advertising window occurs, and the interval between advertising windows. Advertising windows may also be periodic. For example, advertising windows may occur based upon requests that the AP receives from other devices for information regarding services. For example, if an AP does not receive any requests from other devices regarding services offered by the AP, the AP may schedule fewer advertising windows or no advertising windows. Advertising windows may also be scheduled more frequently when the AP receives a number of requests for one or more services. In some aspects, advertising windows may be both periodic and sporadic, such that periodic advertising windows will be sent according to a schedule, and the AP may also supplement these periodic advertising windows with additional sporadic windows. For example, if a large number of devices request a listing of services offered by the AP, the AP may schedule an additional advertising window accordingly.

Advertisements sent during the advertising window may include advertisements of some or all services offered by the AP, or on the network of the AP. In some aspects, the AP may be configured to transmit advertisements of services regardless of inquiries from other devices. For example, the AP may transmit a complete listing of services offered during some or all advertising windows, regardless of inquiries from other devices. In some aspects, the AP may be configured to transmit advertisements during the advertising window based on queries the AP receives from STAs. For example, if a STA requests information regarding one or more specific services, the AP may include information on these one or more services during a next advertisement window, based on the STA request. In some aspects, if advertisements are based on queries received from STAs, the AP may buffer queries received from STAs until an advertising window, and may transmit responses to each of these queries during that advertising window.

Advertising messages may be sent using a number of different types of messaging protocols. For example, Bonjour or Universal Plug 'n Play (UPnP) may be used to offer listings of services on an AP. Uniform resource identifiers (URIs) may also be used to offer listings of services on the AP. In some aspects, modified versions of one or more of these protocols, or other protocols, may also be used to transmit advertising messages. Advertising messages may be sent as a number of different types of frames or messages. For example, advertising messages may be broadcast Access Network Query Protocol (ANQP) messages. For example, service discovery messages that are sent in response to an ANQP query may be sent in broadcast during the advertising window. Advertising messages may also be transmitted as an unencrypted broadcast data frame and/or a broadcast public action frame.

In some aspects, STAs may send ANQP queries at any time. The AP may response with a come-back period that will point to the timing of a future advertising window, or to the Target Beacon Transmit Time (TBTT) of the beacon, where the advertisement window will be advertised. STAs may be configured to go to sleep after receiving the advertising window schedule. Alternatively, a STA may derive the advertisement window timing implicitly from the Probe-Response or the Beacon that it already received, if an advertisement window was already advertised. In this aspect, a STA may go to sleep immediately after sending the query to the AP. In both of these aspects, responses to any query will be sent during the advertisement window.

In some aspects, the AP may use a delayed response to respond to STA queries. For example, the AP may provide a minimum time to respond to a query. This may be provided, for example, in the beacon or the probe response which advertises timing of the advertising windows. For example, the AP may transmit a minimum time to respond to a query in a beacon, along with information on the timing of advertising windows. This may enable a STA which sends a query regarding services offered by the AP to determine when a response to that query may be received. For example, the STA may determine that a response to the query may be received during a next advertising window that is a minimum of at least the minimum time to respond to a query. For example, if the minimum time to respond to a query is 300 ms, a STA that sends a query to the AP may determine that it will not receive a response until the first advertising window that is at least 300 ms from the time the query was sent. In some aspects, the AP may use this time to determine a response to the query. For example, if a STA requests information regarding printers on the AP, the AP may need to determine which, if any, printers may be available through the AP. In some aspects, the minimum time to respond to a query may be transmitted to the STA from the AP in a probe response frame. For example, the STA may request information from the AP regarding printers on the network in a probe request frame. The AP may respond with a probe response frame that includes timing information on which advertising window will contain this information. This timing information may include, for example, a minimum time to respond to a query.

In some aspects, the use of an advertising window and a minimum response time may enable STAs to sleep until the appropriate advertising window. For example, a STA may transmit a query to the AP, and may go to sleep until an advertising window which occurs at a time after the minimum time to respond to a query. For example, if the STA is aware of the minimum time to respond to a query, such as if the STA received this minimum time in a beacon, the STA may sleep until an advertising window after transmitting a query. In some aspects, if the minimum time to respond to a query is contained in a probe response frame, the STA may sleep after receiving the probe response frame until the advertising window.

In some aspects, the AP may be configured to re-transmit queries that it receives during advertising windows. For example, a STA may query an AP for a service, such as a printer. An AP may or may not offer this service. The AP may retransmit this query during the advertising window, in order to allow other STAs to receive the query. This may allow, for example, a STA which offers a printer to receive queries from other STAs, without requiring that the other STAs transmit a query at any certain time, and without requiring the STA to be awake at all times. Instead, the STA offering a printer may be awake during the advertising window, and may receive the retransmitted queries from the AP during the advertising window. This may allow STAs which offer services and efficient way to find STAs which request services, and may also allow these STAs to find each other without requiring that an AP store information regarding each service available on each STA in the network.

Figure 4:
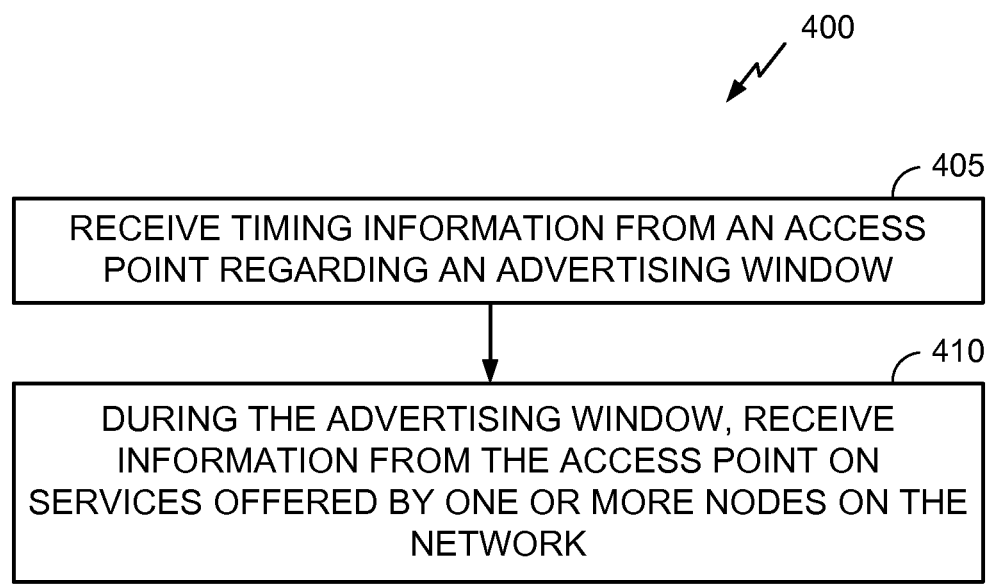
FIG. 4 is a flowchart of a method for using advertising windows on a network, which may be used on a STA such as STA 106.

FIG. 4 is a flowchart of a method for using advertising windows on a network, which may be used on a STA such as STA 106.

At block 405, the STA receives timing information from an access point regarding an advertising window during which information on services offered by one or more nodes on the network will be advertised. In some aspects, the STA may receive this information in a beacon from the AP. In some aspects, the STA may first transmit a probe request frame, containing a request for information on certain services on the network, such as a printer, and the AP may transmit a probe response frame which includes timing information regarding an advertising window. In some aspects, the timing information may include a minimum time to respond to a query. The STA may be configured to use this information to determine when a query submitted by the STA may be responded to. The STA may be configured to enter a low-power doze or sleep mode, or selectively power down some components, such as a receiver, after receiving the timing information until the time of the advertising window that may contain a response to the STAs query.

At block 410, the STA, during the advertising window, receives information from the access point on services offered by one or more nodes on the network. In some aspects, this information may include a response to a query transmitted by the STA to the AP. In some aspects, the STA may also receive re-transmitted queries from the AP, the queries originally being transmitted to the AP from another STA. In some aspects, the STA may be configured to respond to these re-transmitted queries if the STA offers one or more services which are relevant to the STA that originally transmitted the query to the AP. For example, the advertising window may contain a portion of time during which the STA may transmit advertising messages. These advertising messages may include responses to queries and/or may include advertising messages that are generated by the STA autonomously to advertise services offered by the STA.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication in a network, the method comprising: transmitting, by a wireless station, a request for information on services offered by one or more wireless devices on the network via an access point, the request transmitted to the access point;
    receiving, by the wireless station, in response to the request, timing information from the access point indicating a time window during which the information on the services offered by the one or more wireless devices on the network will be transmitted over the network by the access point;
    reducing power consumption, by the wireless station, based on the timing information, until a start of the time window;
    receiving, by the wireless station, the information on the services offered via the network from the access point during the time window, the information on the services offered via the network comprising information on a plurality of services;
    receiving from the access point during the time window, by the wireless station, one or more queries from other wireless stations requesting information on one or more services offered by the wireless station; and
    identifying a wireless station of the other wireless stations requesting a particular service based on one of the one or more queries.

2. The method of claim 1, wherein the request comprises a query, and wherein the method further comprises:
    receiving a response to the query during the time window.

3. The method of claim 2, wherein the timing information is received in a probe response frame, the timing information further indicating a minimum time by which the access point will respond to the query.

4. The method of claim 3, further comprising:
    determining the start of the time window based at least in part upon the minimum time by which the access point will respond to the query.

5. The method of claim 3, wherein the plurality of services comprises one or more of services offered by the access point and services offered by other wireless stations.

6. The method of claim 1, wherein the information on the services offered via the network is received in an unencrypted broadcast data frame transmitted by the access point.

7. The method of claim 1, further comprising:
    during the time window, receiving, from the access point, by the wireless station, one or more queries requesting information on one or more services offered by the wireless station via the network; and
    responding, by the wireless station, during the time window, to one or more of the queries in response to the wireless station offering at least one of the one or more services.

8. The method of claim 1, wherein the receiving by the wireless station utilizes a receiver circuit, and reducing power consumption comprises powering down the receiver circuit.

9. A wireless station for communicating in a network, the wireless station comprising:
    a hardware processor configured to generate a request for information on services offered by one or more wireless devices on the network via an access point;
    a transmitter circuit configured to transmit the request to the access point; and
    a receiver circuit configured to:
        receive, in response to the request, timing information from the access point regarding a time window during which the information on the services offered via the network will be transmitted by the access point over the network;
        reduce power consumption, based on the timing information, until a start of the time window;
        during the time window, receive the information on the services offered via the network from the access point during the time window, the information on the services offered via the network comprising information on a plurality of services; and
        receive from the access point during the time window, by the wireless station, one or more queries from other wireless stations requesting information on one or more services offered by the wireless station, wherein the hardware processor is further configured to identify a wireless station of the other wireless stations requesting a particular service based on one of the one or more queries.

10. The wireless station of claim 9, wherein the request comprises a query, and wherein the receiver circuit is further configured to:
    receive a response to the query during the time window.

11. The wireless station of claim 10, wherein the receiver circuit is further configured to receive the timing information in a probe response frame, the timing information further indicating a minimum time by which the access point will respond to the query.

12. The wireless station of claim 11, wherein the processor is further configured to determine the start of the time window based at least in part upon the timing by which the access point will respond to the query.

13. The wireless station of claim 10, wherein reducing power consumption comprises powering down the receiver circuit.

14. The wireless station of claim 9, wherein the plurality of services comprises one or more of services offered by the access point and services offered by other wireless stations.

15. The wireless station of claim 9, wherein the transmitter circuit is further configured to transmit, during the time window, a message comprising information related to one or more services offered by the wireless station.

\* \* \* \* \*